United States Patent
Gancarcik

(10) Patent No.: US 8,526,584 B2
(45) Date of Patent: Sep. 3, 2013

(54) DEVICE AND METHOD FOR PREVENTING ION BUILD-UP IN LIQUID CRYSTAL DISPLAYS

(75) Inventor: Edward Peter Gancarcik, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 928 days.

(21) Appl. No.: 12/583,343

(22) Filed: Aug. 18, 2009

(65) Prior Publication Data

US 2011/0044441 A1 Feb. 24, 2011

(51) Int. Cl.
*H04M 11/00* (2006.01)
*G09G 3/36* (2006.01)

(52) U.S. Cl.
USPC .......................................... 379/93.05; 345/92

(58) Field of Classification Search
USPC .................... 379/88.01–88.19; 345/204–215
See application file for complete search history.

(56) References Cited

U.S. PATENT DOCUMENTS

| | | | |
|---|---|---|---|
| 5,633,651 A * | 5/1997 | Carvajal et al. | 345/82 |
| 6,507,330 B1 | 1/2003 | Handschy | |
| 2002/0111200 A1 * | 8/2002 | Nikawa et al. | 455/574 |
| 2006/0022929 A1 * | 2/2006 | Hashimoto et al. | 345/96 |
| 2008/0037518 A1 | 2/2008 | Kumarasamy et al. | |
| 2008/0225062 A1 | 9/2008 | Chang | |
| 2009/0290698 A1 * | 11/2009 | Lundgren et al. | 379/142.04 |

FOREIGN PATENT DOCUMENTS

| GB | 2459727 A | 11/2009 |
|---|---|---|
| WO | WO 2005/022244 | 3/2005 |

* cited by examiner

*Primary Examiner* — Simon Sing
*Assistant Examiner* — Solomon Bezuayehu

(57) ABSTRACT

A desktop network protocol telephone set has a network interface for connecting the telephone set to a local area network. An audio interface provides audio signals to and from a handset of the telephone set. A processing circuit is responsive to communications from the network interface. A control circuit coupled to the processing circuit is used for changing a driving frequency of the LCD panel.

7 Claims, 4 Drawing Sheets

DEVICE AND METHOD FOR PREVENTING ION BUILD-UP IN LIQUID CRYSTAL DISPLAYS

FIELD OF THE INVENTION

The present invention relates generally to Liquid Crystal Displays (LCDs), and more particularly, to a device and method for preventing ion build-up in LCDs of a telephone.

BACKGROUND OF THE INVENTION

Telephones having LCD panels are becoming increasingly popular devices. This is especially true in the business community as the LCD panels are used to display a variety of calling and messaging information to the user. The LCD panels on the telephones further provide expanded programmable options for the telephones such as self labeling keys and the like.

Large monochrome LCD panels used in telephones can exhibit areas in the active viewing area of the display where localized dark smudges or spots (hereinafter spots) can occur. These dark spots may occur immediately upon activation of the LCD panel in the telephone or may occur over time. There is presently no practical way of removing dark spots once they appear on the LCD panel.

The dark spots are caused by stray ions migrating within the LC fluid to localized areas. The dark spots may influence viewing area uniformity. These areas are aggravated by static images and contrast ratios that may be set too dark. The amount of ion contamination within a given LCD panel is influenced by the manufacturing process of the LCD panels as well as how the process is controlled by the manufacturer. As a result some LCD panels are resistant to dark spots while others are susceptible.

Therefore, it would be desirable to provide a system and method to overcome the above problem.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DETAILED DESCRIPTION

The present invention encompasses a system and method for preventing ions within the LCD panel from building up and creating dark sports that may hinder clear viewing of the LCD panel. The system and method are disclosed in regards to network protocol telephones, including IP telephones, along with telephone systems including network protocol telephones. However, the system and method may be used with a Public Switched Telephone Network (PSTN), or other type of devices that may use LCD panels.

Figure 1:
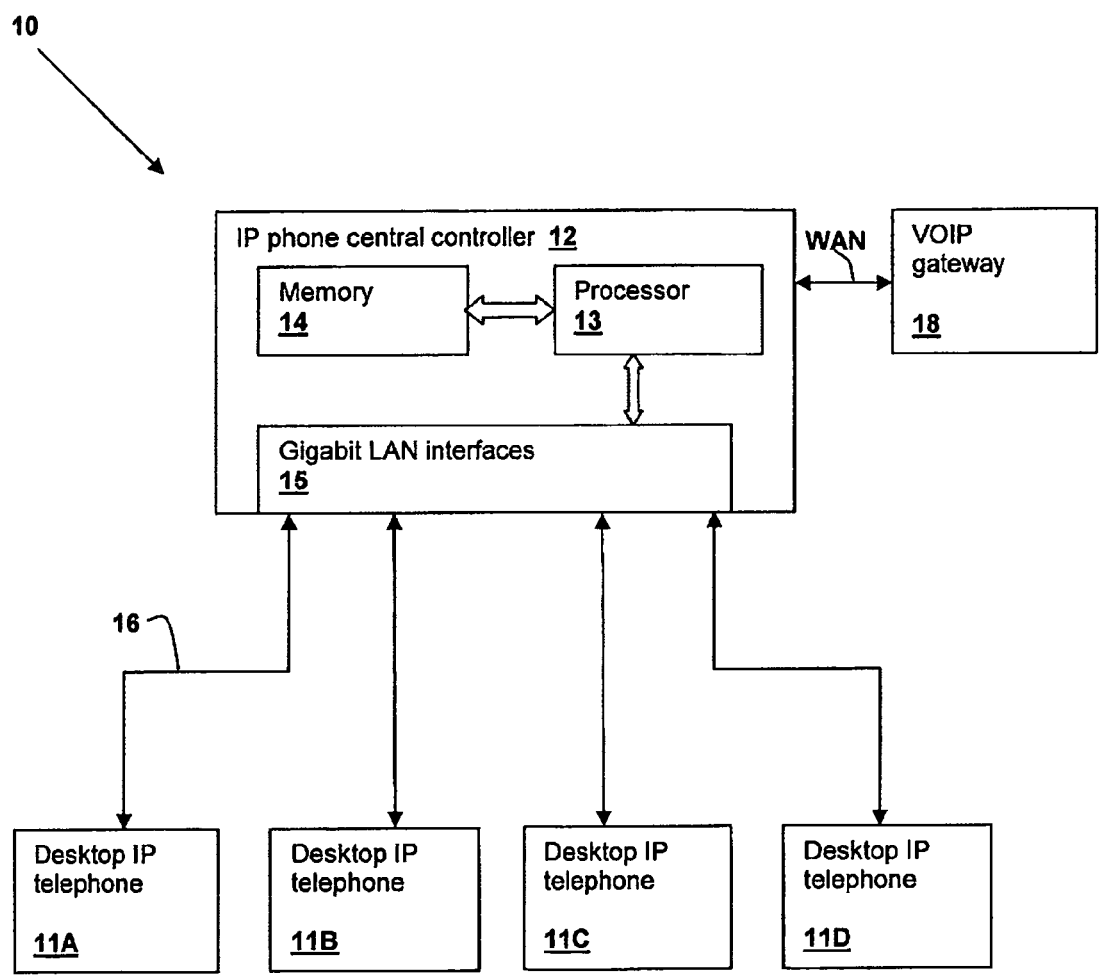
FIG. 1 is a block diagram of a IP telephone system in accordance with an embodiment of the present invention.

With reference now to the figures, and in particular with reference to FIG. 1, an IP telephone system 10 in accordance with an embodiment of the present invention is shown. The depicted embodiment is not intended to be limiting, but only exemplary of the type of telephone system to which the methods and structures of the present invention may be applied.

The IP telephone system 10 has one or more desktop IP telephones 11A-11D coupled to an IP phone central controller 12 by individual local-area network (LAN) connections 16. The LAN connection 16 may be 10/100, gigabit connection, or the like. The LAN connection 16 is in turn coupled to a wide-area network (WAN) connection WAN, through which a remote gateway such as a voice-over Internet protocol (VOIP) gateway 18 can be addressed. Program instructions are provided to implement software algorithms and are stored within a memory 14 of IP phone central controller 12. The program instructions are executed by a processor 13, to provide such functions as a scheduler and messaging functionality as described in further detail below, by communicating with IP telephones 1A-11D via LAN interfaces 15. The LAN interface 15 may be 10/100, Gigabit (10/100/1000) LAN interface, or the like.

Figure 2:
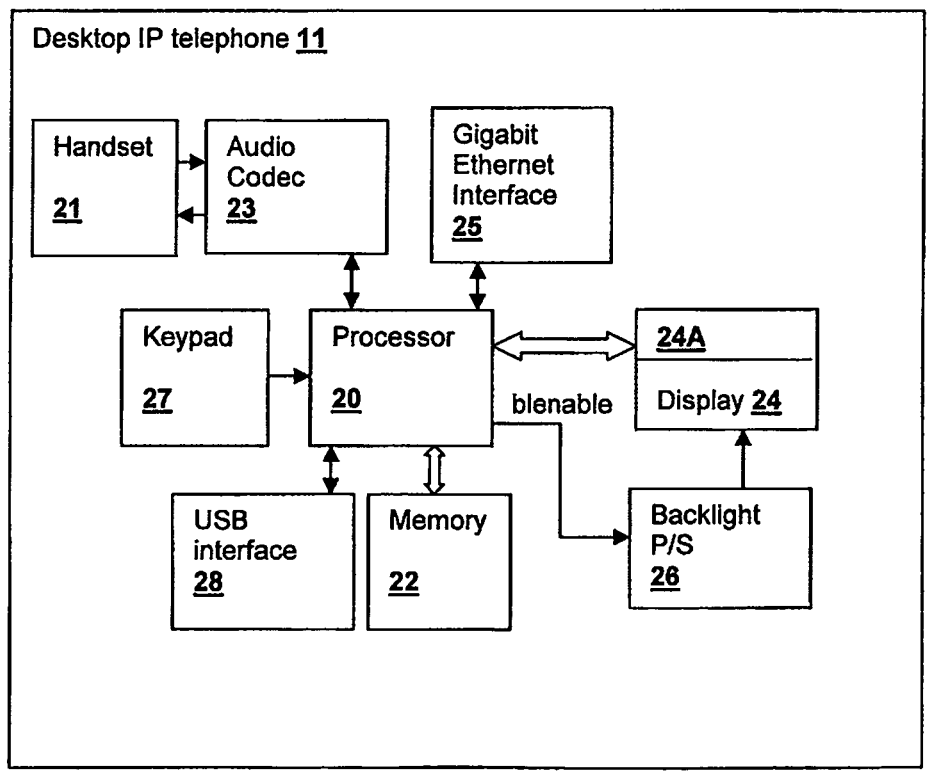
FIG. 2 is a block diagram of an IP telephone in accordance with an embodiment of the present invention.

Referring now to FIG. 2, the desktop IP telephone 11 is controlled by a processor 20. The processor 20 executes program code stored in memory 22 to provide various functions of the desktop IP telephone 11. The depicted example is only illustrative and multiple processors may be provided for different functions within the desktop IP telephone 11. However, a single processor implementation has been shown for clarity. A handset 21 may be interfaced through an audio codec circuit 23 to the processor 20. Audio information received from a microphone in the handset 21 may be converted by the audio codec 23 to information that can be communicated over a Local Area Network (LAN) connected to the Ethernet interface 25. Information received from the Ethernet interface 25 is also converted by the audio codec 23 to audio signals which are provided to an output transducer (speaker) of the handset 21. Processor 20 in combination with audio codec 23, implements a protocol such as Session Initiation Protocol (SIP) or other proprietary protocol to support a telephone connection between VOIP gateway and the desktop IP telephone 11.

Processor 20 may also control energy management states within the desktop IP telephone 11. This may include such things as disabling a backlight power supply 26 that provides power to a backlight within the display 24 and sending commands to the Ethernet interface 25 to place the Ethernet interface 25 and the connection in a power-down state.

The processor 20 may further control other power down functions including, but not limited to, disabling the display driver circuitry 24A to remove any information/text on the LCD display 24 itself, powering down LED indicators (such as message waiting indicator), powering down audio circuitry including a digital signal processor, etc.

The desktop IP telephone 11 may further have an LCD display 24. The LCD display 24 may be used to display a variety of calling and messaging information to the user. The LCD display 24 on the telephones further provide expanded programmable options for the telephones such as self labeling keys and the like. The LCD display 24 may be coupled to a display driver circuitry 24A which may be coupled to the processor 20. The display driver circuitry 24A may receive commands from the processor 20 to control operation of the LCD display 24.

Desktop IP telephone 11 may also include a keypad 27 for providing standard and special telephone button functionality. For example, the keypad 27 may have a button for call forwarding, call transfer, placing a caller on hold, intercom features, placing the desktop IP telephone 11 in an energy savings mode, and the like. The listing of the above is given as an example and should not be seen in a limiting scope.

Desktop IP telephone 11 may also include a USB interface 28 or another suitable interface. The USB interface 28 may be used as interface through which a connection can be established to another device such as personal computer, in order to receive proximity or absence indications. Such indications can also be provided via packets received at the Ethernet interface 25 that originate over a network connection of the personal computer or from a service with which personal computer is interacting, such as an Internet messaging service.

Desktop IP telephone 11 may implement at least one low power operating mode. The low power operating mode may include a deep sleep mode of operation in which Ethernet interface 25, display 24, backlight power supply 26, audio codec 23, and LED indicators are disabled and a light sleep mode of operation wherein the display backlight power supply 26, audio codec 23, and optionally LCD display 24 are de-activated, but Ethernet Interface 25 is maintained in an active state. The keypad 27 may be scanned to determine if buttons are pressed (including the hook switch activated by handset 21) and processor 20 will generally enter periodic idle or sleep modes except when detecting activity, or when a wakeup timer has elapsed.

Figure 3:
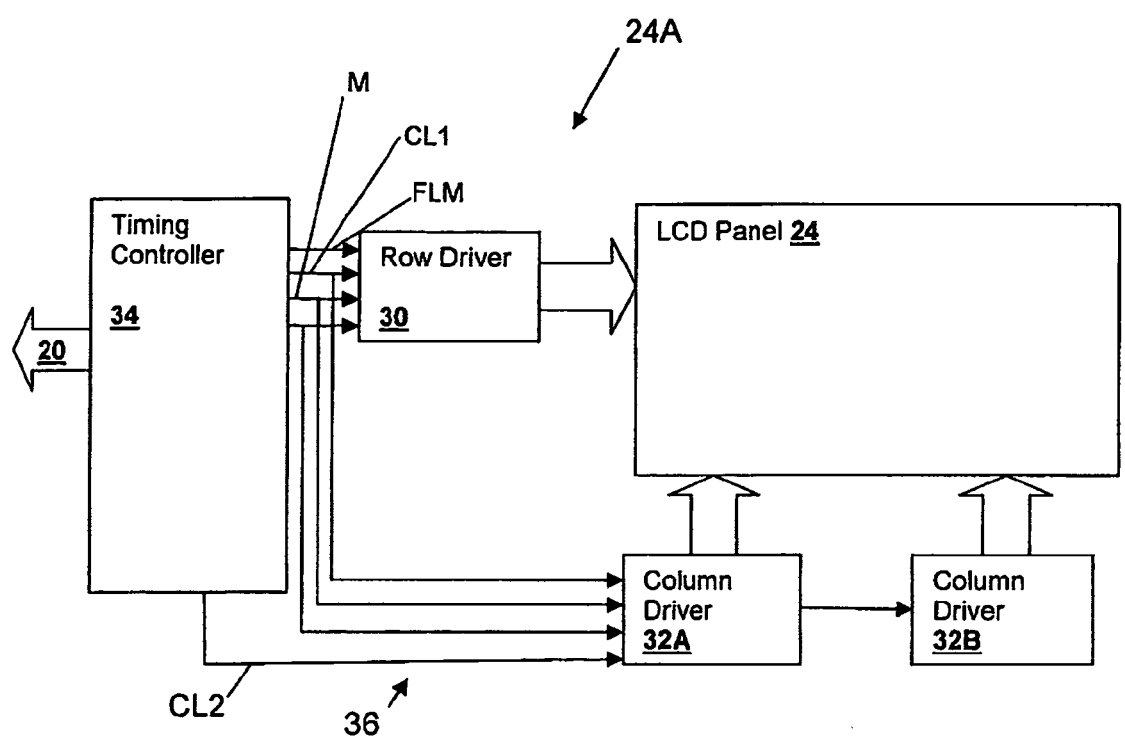
FIG. 3 is a block diagram showing the LCD panel of the IP telephone.

Referring now to FIG. 3, a detailed view of the display driver circuitry 24A is shown. The display driver circuitry 24A may have a row driver 30 and a column driver 32. In accordance with one embodiment, the column driver 32 is comprised of an even number column driver 32A and an odd number column driver 32B. The row driver 30 and the column driver 32 may be used for outputting display data at a specified location on the display 24.

The row driver 30 and the column driver 32 may be coupled to a timing controller 34. In the present embodiment, a plurality of signal lines 36 may be used to couple the row driver 30 and the column driver 32 to the timing controller 34. The timing controller 34 may also be coupled to the processor 20. The timing controller 34 receives the image data to be shown on the display 24 and outputs row control signals, column control signals and pixel data. The row driver 30 receives the row control signals and outputs row driving signals to the LCD panel 24. The column driver 32 receives the column control signals and outputs column driving signals to the LCD panel 24. The LCD panel 24 displays pixel data according to the row driving signals and column driving signals respectively.

In accordance with one embodiment, the signal lines 36 may include, but are not limited to: a First Line Marker (FLM) signal which may be sent at the start of every display frame; CL1 signal which may be a data latch signal, CL2 signal which may be a data shift signal or clock signal; M signal which may be a square wave of approximately 50% duty cycle which is used by the LCD panel 24 to switch the polarity of the display driver voltage to ensure there is no DC component applied across the liquid crystal cell; and data lines. Some of the signal lines 36 may be coupled to both the row driver 30 and the column driver 32. While other signal lines 36 may be coupled just to the row driver 30 or the column driver 32.

Presently, most desktop IP telephone 11 use a clock signal (hereinafter M signal as described above) to drive the LCD panel 24. The M signal is set at a fixed frequency F1. The LCD panel 24 will operate at this fixed frequency F1 regardless of whether the desktop IP telephone 11 is in an active state or in a low power operating mode. In general, the fixed frequency F1 is typically half the FLM refresh rate of the LCD panel 24.

As stated above, the LCD panel 24 may exhibit localized dark spots on the LCD panel 24. Once the dark spots appear on the LCD panel 24, there presently is no practical way of removing them. The dark spots are caused by stray ions migrating within the LC fluid to localized areas.

It has been discovered that the likelihood of dark spots that appear on the LCD panel 24 is inversely proportional to the operating frequency of the M signal of the LCD panel 24. Under certain conditions, the lateral ion speed can be maximized, and the ions may be swept away clearing the localized dark spots on the LCD panel 24. By adjusting the frequency used to drive the LCD panel 24, the ions are prevented from pooling thereby clearing the localized dark spots on the LCD panel 24.

In accordance with one embodiment of the present invention, the timing controller 34 may provide dynamic frequency control for driving the LCD panel 24. This may allow the timing controller 34 to change the frequency used for driving the LCD panel 24. Thus, the timing controller 34 may alter the M signal from the normal operating frequency F1 to a second frequency F2. The LCD panel 24 will then be driven at this second frequency F2 for a predetermined time frame. By operating the LCD panel 24 at the second frequency F2, one may maximize the lateral ion speed, and the ions may be swept away clearing the localized dark spots on the LCD panel 24. The second frequency F2 is generally a frequency higher than F1.

Operating the LCD panel 24 at the higher frequency F2 may increase the power consumption of the LCD panel 24. It may further reduce the contrast ratio of the LCD panel 24. Thus, it may be desirable to drive the LCD panel 24 at the second frequency F2 during the low power operating mode of the desktop IP telephone 11 such as a sleep mode, a screen saver mode, or the like.

The LCD panel 24 may be driven at the frequency F1 for times when the desktop IP telephone 11 is in an active state and at the frequency F2 for the times the desktop IP telephone 11 is in an inactive state or low power operating mode (hereinafter "inactive" state). For example, the "active" operating state of the desktop IP telephone 11 may be defined as the times when the backlight of the LCD panel 24 is operating at user defined maximum intensity. The "idle" state may be defined as the time when the backlight is operating at user defined minimum intensity. The timing controller 34 may signal frequency changes in response to the defined "active" and "inactive" states. Alternatively, when a user answers a call, or dials a phone number, the LCD panel 24 is in a state where information is changing in response to user interaction and this "active" state is the one which would use the normal operating frequency F1. When the desktop IP telephone 11 is idle, or unattended for long periods of time, the LCD panel 24 may be considered in an "inactive" state and could be adjusted to be driven at the second frequency F2 to take advantage of the restorative effects. The "active" and "inactive" states may be user defined. Thus, the above description is given only as examples. The LCD panel 24 may be driven at the frequency F2 at other times without departing from the spirit and scope of the present invention.

Figure 4:
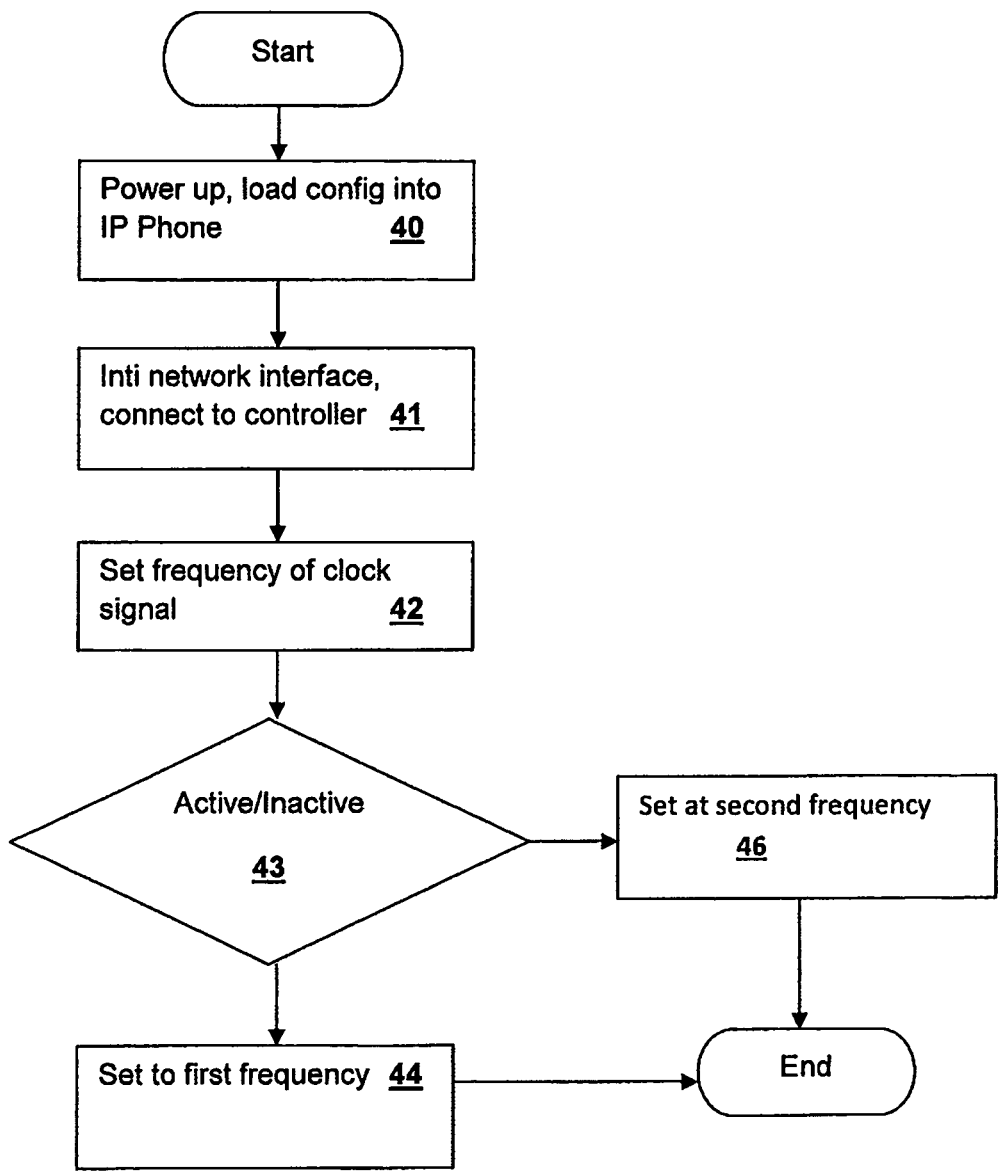
FIG. 4 is a flowchart depicting a method of operation of the IP telephone of FIG. 2 in accordance with an embodiment of the present invention.

Referring now to FIG. 4, a method of removing the localized dark spots on the LCD panel 24 of the desktop IP telephone 11 of FIG. 1 is shown. The IP telephone 11 is initially powered-up (Step 40). Next, the network (LAN) interface of the desktop IP telephone 11 is initialized and connections are established to an IP phone central controller 12 (Step 41).

Upon initial power-on and connection to the IP phone central controller 12, any configuration (and/or program code) that is loaded from IP phone central controller 12 is downloaded to the desktop IP telephone 11.

At predetermined time frames, the processor 20 may send a signal to the timing controller 34 to set the M signal used to drive the LCD panel 24 (Step 42). The timing controller 34 may set the M signal to run at the normal operating frequency F1 or at the second frequency F2. The second frequency F2 is generally a frequency higher than F1. The timing controller 34 may set the frequency in response to defined "active" and "inactive" states. The "active" and "inactive" states may be pre-determined for the desktop IP telephone 11 by simply associating them with the times when the backlight of the LCD panel 24 is driven to the customer selected setting.

The processor 20 may be used to determine when the timing controller 34 sends a signal to alter the clock signal C2 used to drive the LCD panel 24. The processor 20 may be used to determine the "active" and "inactive" states (decision 43). If the processor 20 determines the desktop IP telephone 11 is in an "active" state, the LCD panel 24 will be driven at the frequency F1 (Step 44). If the processor 20 determines that the desktop IP telephone 11 is in an "inactive" state, the LCD panel 34 will be driven at the frequency F2 (Step 45).

The desktop IP telephone 11 provides for dynamic frequency control for driving the LCD panel 24. The desktop IP telephone 11 allows for the changing of the frequency of the M signal in sync with the operating state of the desktop IP telephone 11. By providing a means for driving the LCD panel 24 at a second higher frequency, the desktop IP phone 11 has the ability to reverse any build up of ions that are present in the LC fluid from forming dark smudges in the active area of the LCD panel 24.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A desktop network protocol telephone set, comprising:
   a network interface for connecting the telephone set to a local area network;
   an audio interface for providing audio signals to and from a handset of the telephone set;
   a processing circuit responsive to communications from the network interface; and
   a control circuit for setting a clock signal driving an LCD panel at a first driving frequency during a full power operating mode of the telephone set and a second, higher driving frequency during a low power operating mode of the telephone set.

2. The desktop network protocol telephone set of claim 1, wherein the low power operating mode is when a backlight of the LCD panel is operating at a user defined minimum intensity.

3. The desktop network protocol telephone set of claim 1, wherein the low power operating mode occurs when the telephone set is unattended for a predetermined period of time.

4. The desktop network protocol telephone set of claim 1, wherein the low power operating is user defined.

5. A method of operation of a desktop network protocol telephone set coupled to a local area network by a network interface, comprising:
   first receiving first network transmissions from the local area network corresponding to received audio signals;
   first converting the first network transmissions to a first audio signal provided to a handset of the telephone set;
   second receiving a second audio signal from the handset;
   second converting the second audio signal to second network transmissions and providing them to the network interface;
   determining an operating state of the telephone set;
   setting a frequency of a clock signal driving an LCD panel of the telephone set at a first driving frequency during a full power operating mode of the telephone set and at a second, higher driving frequency during a low power operating mode of the telephone set.

6. The method of claim 5, wherein the low power operating mode is when a backlight of the LCD panel is operating at a user defined minimum intensity.

7. The method of claim 5, wherein the full power operating mode is when a backlight of the LCD panel is operating at a user defined maximum intensity.

* * * * *